(12) United States Patent
Puzrin et al.

(10) Patent No.: US 9,679,451 B2
(45) Date of Patent: Jun. 13, 2017

(54) FIBRE OPTIC BASED INTRUSION SENSING SYSTEM

(71) Applicant: ETH Zurich, Zurich (CH)

(72) Inventors: Alexander Puzrin, Zurich (CH); Dominik Hauswirth, Aarau (CH); Balz Friedli, Zurich (CH)

(73) Assignee: ETH Zurich, Zurich (CH)

( * ) Notice: Subject to any disclaimer, the term of this patent is extended or adjusted under 35 U.S.C. 154(b) by 0 days.

(21) Appl. No.: 14/784,766

(22) PCT Filed: Apr. 15, 2014

(86) PCT No.: PCT/EP2014/001006
§ 371 (c)(1),
(2) Date: Oct. 15, 2015

(87) PCT Pub. No.: WO2014/170013
PCT Pub. Date: Oct. 23, 2014

(65) Prior Publication Data
US 2016/0086459 A1    Mar. 24, 2016

(30) Foreign Application Priority Data

Apr. 17, 2013  (EP) .................................... 13002005
Sep. 5, 2013   (EP) .................................... 13004350

(51) Int. Cl.
*G08B 13/18* (2006.01)
*G08B 13/12* (2006.01)
(Continued)

(52) U.S. Cl.
CPC ........... *G08B 13/124* (2013.01); *G01D 5/353* (2013.01); *G01V 8/24* (2013.01)

(58) Field of Classification Search
CPC .... G08B 13/124; G08B 13/10; G08B 13/186; G08B 13/183; G08B 13/00; G08B 13/122;
(Continued)

(56) References Cited

U.S. PATENT DOCUMENTS 4,482,890 A   11/1984  Forbes et al.
4,931,771 A    6/1990  Kahn
(Continued)

FOREIGN PATENT DOCUMENTS

| GB | 2262803 A    | 6/1993 |
| WO | 9400732 A1   | 1/1994 |
| WO | 2011058312 A2| 5/2011 |
| WO | 2012022934 A2| 2/2012 |

OTHER PUBLICATIONS

Boussinesq, "A L'Etude De L'Equilibre Et Du Mouvement Des Solides Elastiques", Memoires de la Societe Des Sciences, 1885, p. 4-722.
(Continued)

*Primary Examiner* — Anh V La
(74) *Attorney, Agent, or Firm* — The Webb Law Firm (57) ABSTRACT

A fiber optic based intrusion sensing system includes two or more fiber optic cables buried in a shallow trench in the ground, side by side in a predetermined nonzero distance to each other and at one or more predetermined depths. A dynamic distributed fiber optic interrogator measures a predetermined property related to a change in the length of the cables connected to it. A control unit is connected to all interrogators and analyzes the measurements of the predetermined property and identifies objects on the surface by combining the simultaneous measurements of all cables and correlating the measurements to the type of object on the ground surface, the location of the object on the perimeter, (Continued)

the weight, speed and direction of the object, particularly the direction in or out of the secured perimeter.

11 Claims, 11 Drawing Sheets

(51) Int. Cl.
*G01D 5/353* (2006.01)
*G01V 8/24* (2006.01)

(58) Field of Classification Search
CPC ............ G08B 13/2491; G08B 13/1481; G08B 13/2494; G08B 21/22; G01V 8/24; G01V 8/16; G01D 5/353; G01D 5/35361; Y10T 307/766; Y10T 307/786
USPC ....... 340/556, 541, 565, 551, 552, 555, 557, 340/561, 564; 250/227.16
See application file for complete search history.

(56) References Cited

U.S. PATENT DOCUMENTS

| | | | |
|---|---|---|---|
| 5,134,386 | A | 7/1992 | Swanic |
| 5,194,847 | A | 3/1993 | Taylor et al. |
| 5,285,077 | A * | 2/1994 | Hales ............... G01V 8/24 250/223 R |
| 5,355,208 | A | 10/1994 | Crawford et al. |
| 2005/0077455 | A1 | 4/2005 | Townley-Smith et al. |
| 2005/0147340 | A1 * | 7/2005 | Tapanes ............... G08B 13/186 385/12 |
| 2011/0075152 | A1 | 3/2011 | Huffman |
| 2012/0130930 | A1 | 5/2012 | Klar et al. |
| 2012/0230629 | A1 | 9/2012 | Hill et al. |
| 2013/0151203 | A1 | 6/2013 | McEwen-King et al. |

OTHER PUBLICATIONS

Burland et al., "A logarithmic stress-strain function for rocks and soil", Geotechnique, Jan. 1996, p. 157-164, vol. 46.

Froggatt et al., "High-spatial-resolution distributed strain measurement in optical fiber with Rayleigh scatter", Applied Optics, Apr. 1, 1998, p. 1735-1740, vol. 37, No. 10.

Juarez et al., "Distributed Fiber-Optic Intrusion Sensor System", Journal of Lightwave Technology, Jun. 2005, p. 2081-2087, vol. 23, No. 6.

Juarez et al., "Field test of a distributed fiber-optic intrusion sensor system for long perimeters", Applied Optics, Apr. 10, 2007, p. 1968-1971, vol. 46, No. 11.

Kirkendall et al., "Distributed Fiber Optic Sensing for Homeland Security", Optical Sciences, NRL Review, 2007, p. 195-196.

Klar et al., "Feasibility study of automated detection of tunnel excavation by Brillouin optical time domain reflectometry", Tunnelling and Underground Space Technology, Apr. 28, 2010, p. 575-586, vol. 25.

Madsen et al., "Intruder Signature Analysis from a Phase-sensitive Distributed Fiber-optic Perimeter Sensor", SPIE, Oct. 2007, p. 1-8, vol. 6770.

Madsen et al., "Real-Time Processing of a Phase-Sensitive Distributed Fiber Optic Perimeter Sensor", SPIE, May 2008, p. 1-8, vol. 6943.

Nikles, "Fibre Optic Distributed Scattering Sensing System: Perspectives and Challenges for High Performance Applications", SPIE, Jul. 2007, p. 1-8, vol. 6619.

Park et al., "A fiber optic intrusion sensor with the configuration of an optical time domain reflectometer using coherent interference of Rayleigh backscattering", SPIE, Aug. 1998, p. 49-56, vol. 3555.

* cited by examiner

FIBRE OPTIC BASED INTRUSION SENSING SYSTEM

CROSS-REFERENCE TO RELATED APPLICATIONS

This application is the United States national phase of International Application No. PCT/EP2014/001006 filed Apr. 15, 2014, and claims priority to European Patent Application Nos. 13002005.0 and 13004350.8 filed Apr. 17, 2013 and Sep. 5, 2013, respectively, the disclosures of which are hereby incorporated in their entirety by reference.

BACKGROUND OF THE INVENTION

Field of the Invention

The present invention relates to a fibre optic based intrusion sensing system comprising at least one fiber optic cable buried in a shallow trench in the ground, a fibre optic interrogator measuring a predetermined property related to a change in the length of the cable and a control unit, wherein the cable having one end connected to an interrogator and a free second end at the end of the monitored perimeter, wherein the control unit is connected to the interrogator and adapted to analyse the measurements of said predetermined property and adapted to detect the presence of a specific object on the surface near the perimeter and identify the type of the object.

Description of Related Art

U.S. Pat. No. 5,194,847 A by Taylor and Lee discloses an apparatus for sensing intrusion into a predefined perimeter using buried fibre optic cables. The fiber optic cable is placed along a predefined perimeter which shall be monitored. The used apparatus roughly consists of a light source, an interferometer and a photodetector, which is able to detect the change of the backscattered light in an optical fiber. This change is interpreted as an intrusion. Using the time of flight of the light pulse in the fiber allows for locating the intrusion.

WO 2011/058312 A2 by Hill D. J. and McEwen-King M. describes a method for distributed sensing comprising a plurality of longitudinal sensing portions, which are all located along one cable. The different sensing portions are used to measure different sensing functions.

WO 2012/022934 A2 by McEwen-King M., Hill D. J. and Godfrey A. describes a system for the detection of moving objects based on distributed acoustic sensing along one buried fibre optic cable. The object is detected via the acoustic signal it produces during the movement over the fibre optic cable.

US 2012/130930 A1 by Klar et al. discloses a system, where one fibre optic cable is buried in a shallow trench and in deep boreholes to detect underground tunneling. The effect of tunnel excavation on the strains in the fiber optic cables is investigated. It is stated that surface loads may induce strains in a buried cable at a shallow depth which may disturb the signal caused by the tunneling. Tests with different surface loads were performed and the corresponding strain in one cable was measured. No attempt was made to identify the loads on the surface using the strain along the cable.

U.S. Pat. No. 4,482,890 A by Forbes G. et al. discloses an intruder detection system using a cable containing several parallel fibres wherein the fibres are placed in contact to each other. The cable with multiple fibres is used as a microbend sensor to measure compression of the soil due to an intruder.

Juarez J. C., Maier E. W., Choi K. N., and Taylor H. F. have published a paper "Distributed fiber-optic intrusion sensor system" in Journal of Lightwave Technology, vol. 23, pp. 2081-2087, 2005. Juarez J. C., Taylor H. F. have published a paper "Field test of a distributed fiber-optic intrusion sensor system for long perimeters", Applied Optics, Vol. 46, Issue 11, pp. 1968-1971, 2007. Park J., Lee W. and Taylor H. F. have published a paper "A fiber optic intrusion sensor with the configuration of an optical time domain reflectometer using coherent interference of Rayleigh backscattering" in Proc. SPIE, 3555, 49-56, 1998. Juarez et al. as well as Park et al. at Texas A&M University improved the perimeter intrusion detection system based on U.S. Pat. No. 5,194,847 A. Klar A., Linker R. have also published a paper "Feasibility study of automated detection of tunnel excavation by Brillouin optical time domain reflectometry", Tunneling and Underground Space Technology 25, 575-586, 2010. These authors also showed applicability of the system for intrusion detection and localization of the intruder in laboratory and field tests.

Madsen C. K., Bae T., Snider T. have published "Intruder Signature Analysis from a Phase-sensitive Distributed Fiber-optic Perimeter Sensor" in Fiber Optic Sensors and Applications V, Proc. of SPIE Vol. 6770, 67700K, 2007. A further publication is from Madsen C. K., Snider W. T., Atkins R. A., and Simcik J. C. as "Real-Time Processing of a Phase-Sensitive Distributed Fiber Optic Perimeter Sensor" in Proc. SPIE, Sensors, and Command, Control, Communications, and Intelligence (C3I) Technologies for Homeland Security and Homeland Defense VII, vol. 6943, no. 6943-36, 2008. These two publications, Madsen et al. (2007) and Madsen et al. (2008), show that these groups were able to extract a vibration signature of the intruder from the measured data by signal processing using the technology based on U.S. Pat. No. 5,194,847 A. This signature allows for a distinction between different intruders (e.g. a pedestrian and a car). The signature showed for a car, however, might be also caused by other machines or vehicles. Furthermore they managed to do the signal processing to provide the signature of the intruder in real-time.

Kirkendall C. K., Bartolo R., Salzano J., Daley K. have shown with their publication, "Distributed Fiber Optic Sensing for Homeland Security" in Naval Research Laboratory, Washington D.C., 2007, that they had developed their own distributed fiber optic sensing system to monitor intrusion of a perimeter and borders. In their system the fiber optic cable works as distributed seismic sensor. The intruder induces seismic waves in the subsoil which are detected along the cable. In field tests they show applicability to detection and localization of the intruder in the same way as the system used by Madsen et al. (2007).

SUMMARY OF THE INVENTION

All currently available and published perimeter intrusion detection systems, using one buried fiber optic cable, are able to detect and localize an intruder on the surface, while the system developed at Texas A&M University, Madsen et al. (2007) is even able to extract a signature of the intruder out of the measured data. However, none of these systems is capable to clearly identify the objects on the ground surface.

Based on this prior art it is an aim of the present invention to provide a secure object identification upon detection of an intrusion signal.

It is further within the reach of the present invention to measure accurately any property related to a change in length of buried fibre optic cables and to use these measurements in order to detect and identify any object on the ground surface.

A fibre optic based intrusion sensing system can comprise two or more parallel fiber optic cables buried in a shallow trench in the ground in such a way that the fibre exhibits the same displacements as the surrounding material of the ground. This feature can be realized using tight buffered cables with outer diameters of approx. 1-10 mm and low tensile stiffness. The fibres have to be chosen to exhibit the same displacements as the surrounding soil (e.g. slip), otherwise the inverse analysis is not optimum and very accurate because according to the simplest embodiment one does not measure soil deformations. They are buried side by side with a defined nonzero distance to each other at predetermined depths, each of them having one end connected to an interrogator and a free second end at the end of the monitored perimeter.

The invention is inter alia based on the insight that the use of a combination of simultaneous measurements of two or more parallel buried fibre optic cables is essential to enable a quick and simple identification of objects on the ground surface. The invention uses a mechanical model and mechanical inverse analysis to back-calculate the contact forces acting on the ground surface. The mechanical inverse analysis uses a mathematical model of the ground as a solid half space, loaded with arbitrary forces on its surface. This mathematical model is capable of mapping the forces acting on the surface to the distinct displacement field of the whole half space formed by the ground. This displacement field is evaluated along fictitious lines in the half space where the fibre optic cables are located. Strains are calculated out of the displacements by differentiating the displacements with respect to the spatial coordinate along the fictitious cable. This calculated strain using the mathematical model of the half space is compared to the measured strains along the buried fibre optic cables and the forces acting on the surface are optimized by minimizing the error between the measured and the calculated strains, e.g. least squares optimization. One of the systems according to the invention uses the position and the magnitude of these contact forces to identify the object on the surface.

Compared to the above mentioned prior art systems the present invention uses the simultaneous measurements in two or more buried fibre optic cables and allows the application of a mechanical model of the contact problem between any object on the surface and the ground to perform a mechanical inverse analysis and identify the location and the magnitude of the contact forces acting on the ground surface with high temporal resolution.

A system for detecting intrusion and identifying the intruding object at any location along a large perimeter using ground buried fiber optic cables is as such disclosed. The fiber optic cables, together with a fiber optic sensing interrogator work as distributed dynamical strain sensors, which measure a property of the fibre cable indicating a change in the length of the fibre. Two or more parallel buried cables are used to measure the strains in the ground produced by an object on the surface. The measurements of all the cables are combined and analysed. By applying mechanical inverse analysis of the contact problem between the object and the continuum half space formed by the ground, the load over time on the surface is back-calculated. The back-calculated load pattern over time on the surface allows for a distinct identification of the intruding object on the surface In other words, the present invention relates to a buried fibre optic perimeter monitoring system and method for object identification. Tight buffered fibre optic cables are buried in a shallow trench in a predetermined way. A fibre optic interrogator is provided to be used to measure any property related to a change in the length of the fibre. The measurements are used to calculate the corresponding contact forces over time between the object and the ground surface. Different types of objects are correlated to the pattern of the contact forces over time. Object identification provides an alarm system to identify threatening intrusions of a secured perimeter and allows preventing false positives.

The invention relates to a perimeter monitoring system composed of buried fibre optic cables. With a fibre optic interrogator any property related to a change in length of the fibre is measured with high accuracy (~1 microstrain=1 $\mu$m/m), high spatial resolution (~1-20 millimeter) and high frequency (~50-1000 Hz). The change in the length of the fibre can be measured with any fibre optic sensing technology (e.g. Swept wavelength interferometry to measure the Rayleigh backscatter, Frogatt and Moore (1998); Brillouin optical time domain analysis, Nikles (2007), etc.). An object on the ground surface induces a distinct displacement field in the ground. Due to these displacements of the ground, the buried cables are strained. This strain is measured and when exceeding a predefined threshold is exceeded, the system emits an alarm that the perimeter had been crossed by any object and provides information about the type of the object.

The buried fibre optic cables are tight buffered, i.e. the coating of the fibre made from synthetic plastic material and or a possible metal coating is connected tightly to the glass fibre. This ensures the strain of the coating to be coupled to the strain in the fibre and allows measuring the true ground displacements due to an object on the ground surface along a line with high precision.

The measurement of the ground displacement along the fibre optic cables allows for an inverse calculation of the forces acting on the ground surface. This inverse analysis is done using a mechanical model of the contact problem between the object and the ground surface. Depending on the ground, more or less sophisticated constitutive laws for the mechanical model are required (e.g. linear isotropic elasticity, Boussinesq (1885); linear cross-anisotropic elasticity; non-linear elasticity, Puzrin and Burland (1996); elasto-plastic constitutive laws). The result of the inverse analysis is a pattern of contact forces on the surface over time and is represented by the location and the magnitude of the contact forces for each measurement time.

The mechanical model may be calibrated in advance to improve the accuracy of the inverse analysis. The calibration procedure is performed in the field and involves static or dynamic loading of the ground surface above the secured perimeter with predefined objects (e.g. vehicle driving along the perimeter, placing a defined weight at defined locations along the perimeter). The parameters of the mechanical model are then optimized in such a way that the difference between the theoretical predicted and the measured strains are minimized. The calibrated mechanical model allows for an improved identification of the location and the magnitude of the contact forces between the object and the ground surface.

Different objects moving on the surface produce different patterns of contact forces over time. Using the inverse calculated pattern of contact forces over time, a correlation of different object types is done. With this procedure the objects moving or standing on the perimeter containing the buried fibre optic cables are identified.

When one or more fibre optic cables are placed in a loop, then the arms of the loop can be provided parallel to each other in one trench with a defined nonzero distance to each other a and in a defined depth, wherein each arm of the loop has the same function as one cable. In the inverse analysis, the date of each arm of the loop is used as if it was one cable of different cables provided in parallel one to the other In another embodiment the loop is formed based on two or more cables. Then an entire closed perimeter can be monitored and any cut through one or more cable would still allow monitoring the perimeter based on a plurality of cables having then "free ends" at the location of the trench. Of course, this necessitates the provision of a detection routine and a change of the monitoring surveillance.

The control unit can analyse the measurements and identify objects on the surface by combining the measurements of all the parallel cables and performing mechanical inverse analysis in order to calculate the dynamic contact forces acting between the object and the ground surface and using the calculated pattern of contact forces over time and correlate it to the type of object on the surface, the location of the object on the perimeter, the weight of the object, the speed of the object and the direction of the object. Wherein the prior art provides only the detection of the object using the measured signal in the cable, here the step using the mechanical inverse analysis is added and the correlation to the type of the object is done depending on the back-calculated contact force pattern over time.

According to a further preferred embodiment the control unit receives further calibration signals based on the mechanical inverse analysis in advance in time by moving defined objects over the surface and using the knowledge of the objects (e.g. weight, location, speed, direction of movement) as input. Then the parameters of the mechanical model use for the inverse analysis are calibrated, wherein this calibration process is done in the laboratory on a standardized soil used to refill the trench in the field. The situation of the cables, distances a and heights h are not important due to the fact that soil parameters are independent to this situation. Any placing of the cables will allow to calibrate these soil parameters and will lead to the same soil parameters.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF THE INVENTION

Figure 1:
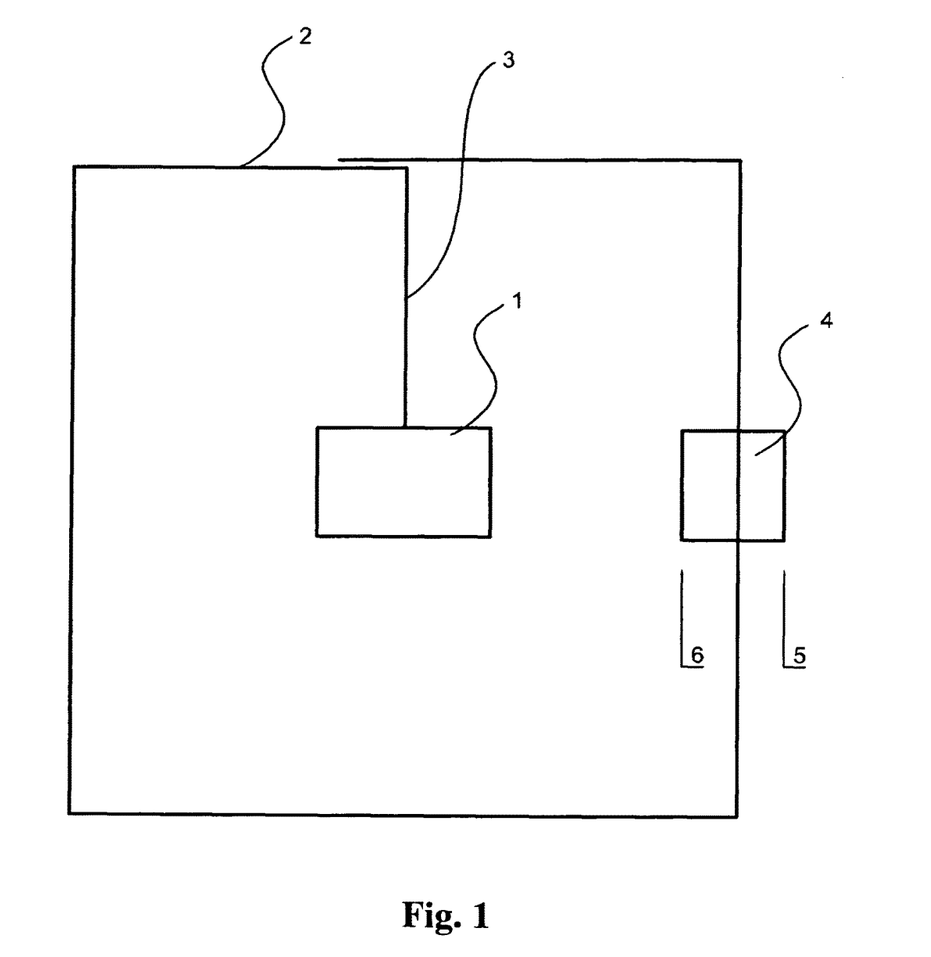
FIG. 1 shows a schematic sketch of a perimeter to be monitored with a perimeter monitoring system comprising two or more buried cable around a sensitive facility

FIG. 1 shows a schematic sketch of a perimeter to be monitored with a perimeter monitoring system comprising two or more buried cable around a sensitive facility 1. Such a perimeter monitoring system can also be described as a fibre optic based intrusion sensing system.

The sensitive facility 1, which has to be secured, is hosting a fibre optic interrogator and a control unit. The secured perimeter 2 is monitored with at least two buried fibre optic cables 10 in each cross section (see FIGS. 2 to 5). The arrangement of the cables may vary (see FIGS. 2 to 5), e.g. can comprise free ends or being provided as a loop for each cable.

The feed cable 3 runs from the interrogator 13 and control unit 14 to the secured perimeter 2. An object 4, which has to be identified, is crossing the perimeter 2 with the buried fibre optic cables from outside 5 the perimeter towards inside 6 the perimeter. Of course, it is not mandatory but preferred to provide the interrogator 13 and control unit 14 in a distance from the secured perimeter 2 on the inside 6 to avoid direct access to the cables 10 before detection. Of course the system is also capable to detect a movement from the inside 6 to the outside 5, which can be interesting if a long not-closed line, like a border, is to be monitored.

Figure 2:
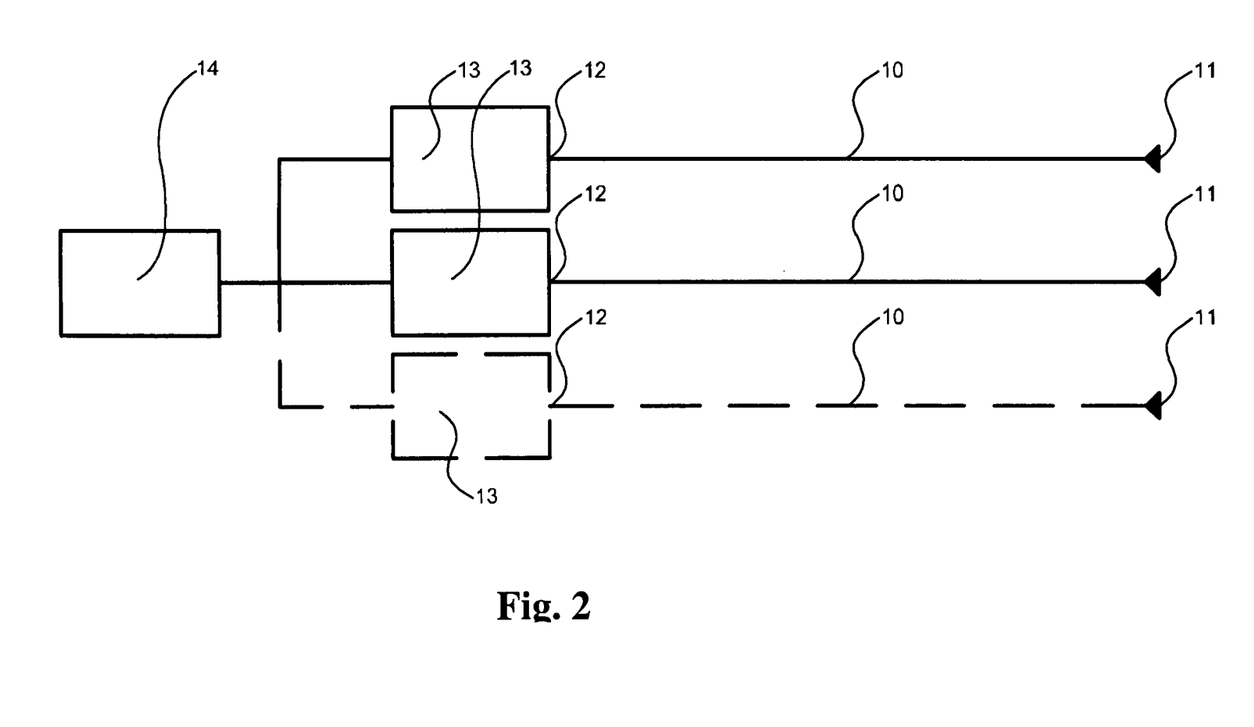
FIG. 2 shows a schematic sketch of a perimeter monitoring system with three parallel buried fibre optic cables for the situation of FIG. 1.
Figure 5A:
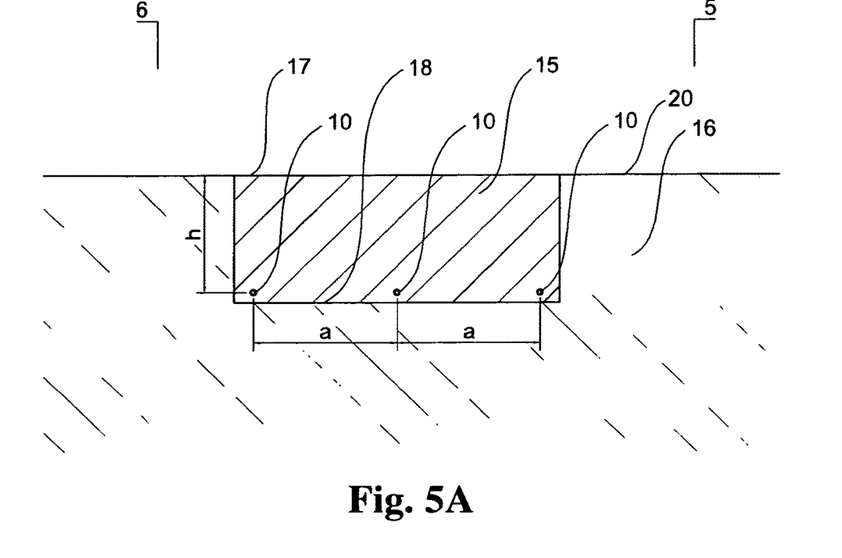
FIG. 5A to 5C show different cross-sections of shallow trenches containing the buried fibre optic cables according to different embodiments according to FIG. 1.

FIG. 2 shows a schematic sketch of a perimeter monitoring system with three parallel buried fibre optic cables 10 for the situation of FIG. 1. Two (continuous lines) or more (dashed line) fibre optic cables 10 are buried in a shallow trench 15 (see FIG. 5) in the ground 16. The fibre optic cables 10 have free ends 11. A further and opposite end 12 of each fibre optic cable 10 is connected to a dynamic distributed fibre optic interrogator 13. A control unit 14 is combining the measurements of all the cables 10 and identifying the object 4 on the ground surface 20.

Figure 3:
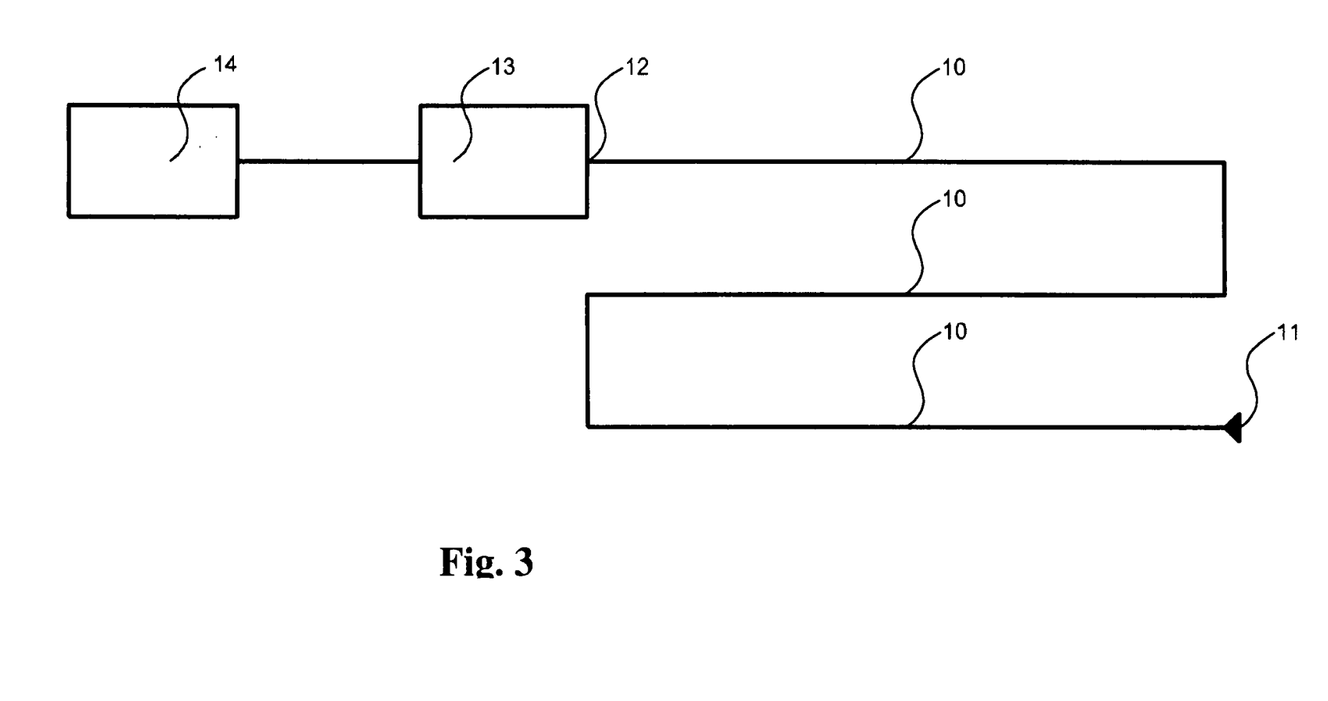
FIG. 3 shows a schematic sketch of a perimeter monitoring system with one cable placed in serpentines for the situation of FIG. 1.

FIG. 3 shows a schematic sketch of a perimeter monitoring system with one or more buried fibre optic cable 10 placed in a serpentine for the situation of FIG. 1. The bends of the serpentine are placed at the start and the end of the perimeter respectively, such that the cable crosses each cross-section (see FIG. 5) two or more times and each part of the cable is parallel to each other between the bends. The cable 10 has a free end 11 which can be placed either at the start or the end of the secured perimeter. A further end 12 of the fibre optic cable 10 is connected to a dynamic distributed fibre optic interrogator 13. A control unit 14 is combining the measurements of all the parts of the cable serpentine 10 and identifying the object 4 on the ground surface 20. One or more fibre optic cables may be used but each cross-section along the secured perimeter 2 contains at least two fibre optic cables.

Figure 4:
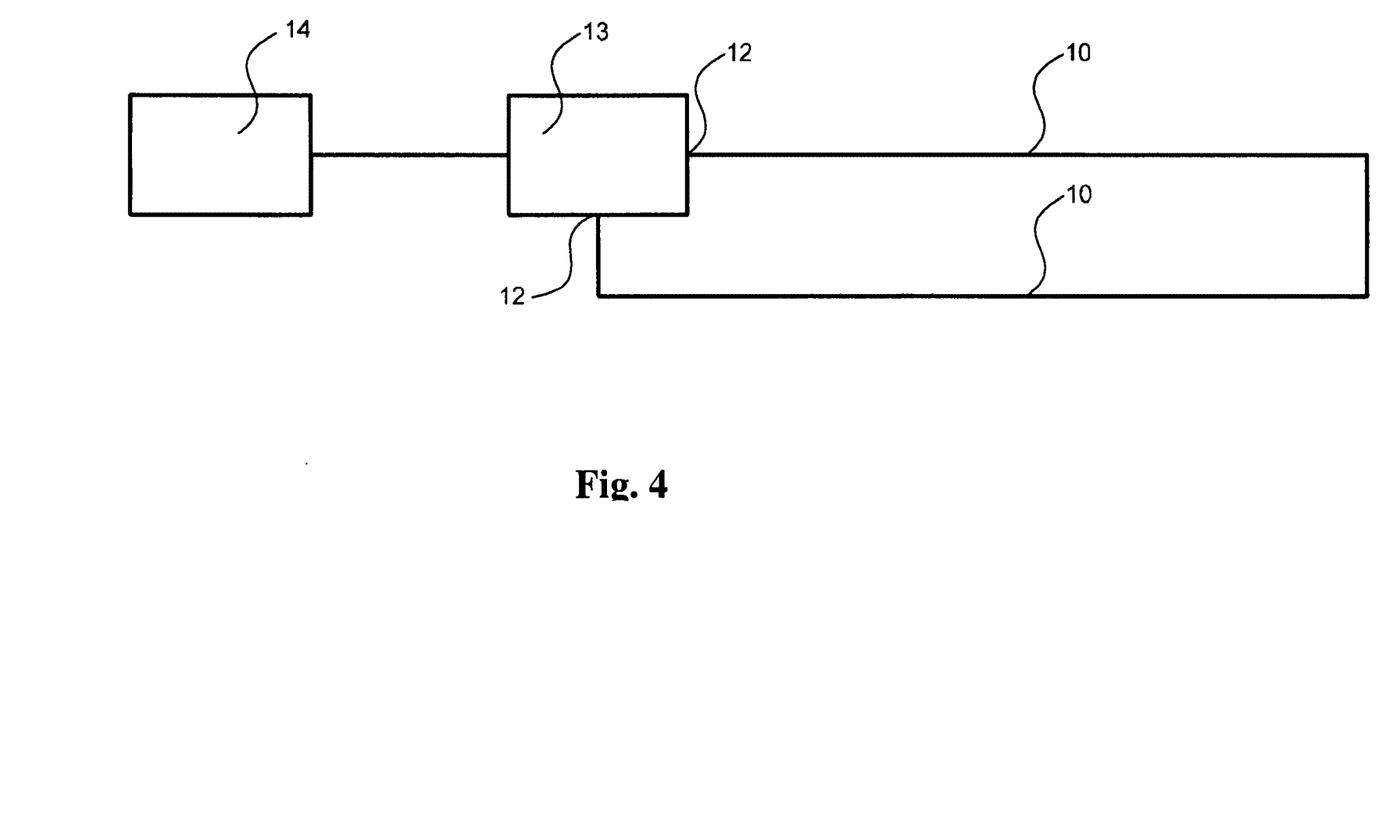
FIG. 4 shows a schematic sketch of a perimeter monitoring system with one buried fibre optic cable placed in a loop for the situation of FIG. 1.

FIG. 4 shows a schematic sketch of a perimeter monitoring system with one or more buried fibre optic cables 10 placed in a loop for the situation of FIG. 1. The loop is place in such a way that both arms of the loop cross each cross-section (see FIG. 5) along the secured perimeter. The cable 10 has two ends 12 connected to a dynamic distributed fibre optic interrogator 13. A control unit 14 is combining the measurements of both arms 10 and identifying the object 4 on the ground surface 20. One or more fibre optic cables may be placed in such a loop.

If more than one cable 10 is used, then it would also be possible to arrange all cables 10 in loops having the form of the closed perimeter 2 in FIG. 1, where the free ends of all cables 10 would run parallel to line 3 to the center to close the loop at that place.

For the disclosed perimeter monitoring system it is preferred but not mandatory to use tight buffered fibre optic cables. A tight buffered fibre optic cable 10 is a cable comprising for example a standard commercially single mode fibre with a 9 μm glass core and a 125 μm glass cladding coated by a 250 μm primary buffer connected tight to prevent slippage, around the primary buffer a protection coating comprising for example a 0.9 mm second plastic buffer and a Polyamide protection sheet with outer diameter between 1 mm and 10 mm is placed, alternatively the protection coating can contain a steel armouring built of a thin steel tube placed between the second plastic buffer and the Polyamide protection sheet. It is also possible to use other fibre optic cables 10 which might have less protection around the fibre optic core. Depending on the interrogation technique used to perform distributed strain or displacement measurements along the cable also multimode cables can be used. The main common feature of usable cables 10 is a fibre built from a material which is able to transport light pulses over long distances, e.g. glass.

A dynamic distributed fibre optic interrogator 13 is a commercially available device e.g. from Luna Inc. or Neubrex Co. and its main function is to generate light pulses, to feed them into the fibre core and to detect back scattered light. The expression dynamic denotes a high sample rate of the interrogator and the expression distributed means that measurements are not taken at discrete points on the cable but distributed along the whole cable with one single measurement, comparable to lots of point sensors arranged along a line. With the change in the backscattered light compared to a reference measurement, the interrogator calculates the change in the length of the fibre along the length of the fibre (i.e. strain). A dynamic distributed fibre optic interrogator measures strains along the fibre with high accuracy (~1 microstrain=1 μm/m), high spatial resolution (~1-20 millimeter) and high frequency (~50-1000 Hz). Detailed description of the physical background and the mode of operation of such an interrogator are described in Frogatt et al. 1998 as mentioned in the introduction of the present specification.

The control unit 14 is adapted to receive the signals from the different fibre optic interrogators 13 and combines these into an answer signal of the intrusion detection system according to the following description.

Figure 5B:
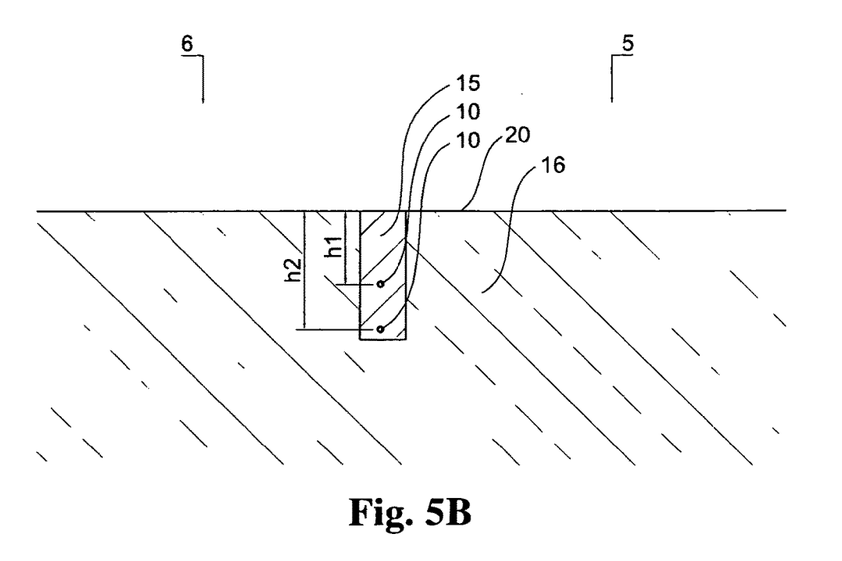
Figure 5C:
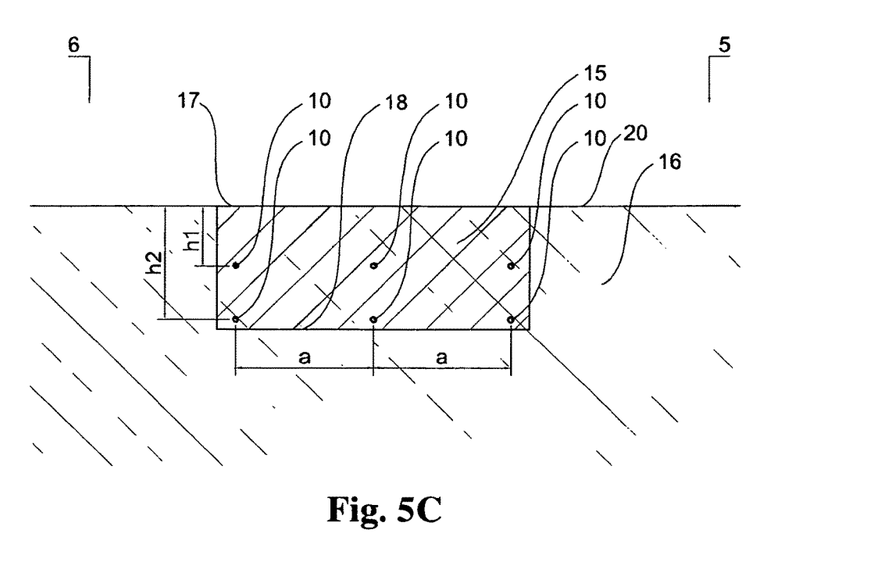

FIG. 5A to 5C show different cross-sections of the shallow trench 15 containing the buried fibre optic cables 10. The following definitions are used in this context and used as such in the drawings:

| | |
|---|---|
| h | defines the depth of a cable 10 with respect to the ground surface 20 |
| a | defines the horizontal distance of each cable 10 to one another |
| h1 | depth of the upper buried fibre optic cable(s) 10 with respect to the ground surface 20 |
| h2 | depth of the lower buried fibre optic cable(s) 10 with respect to the ground surface 20 |

FIG. 5A now shows three cables 10, as an example of "two or more" parallel buried fibre optic cables 10, side by side near the bottom surface 18 of the trench 15. However it is also possible to provide the cables 10 at a higher position. However, since the major influence on the signal detection as will be shown subsequently is based on the soil portion between the ground surface 20 and the cable 10, it is preferred to prepare the depth of a trench 15 only to the necessary extent.

FIG. 5B shows two parallel buried fibre optic cables 10 one over the other. Finally, FIG. 3C shows six parallel buried fibre optic cables 10 placed in a matrix configuration 2×3, i.e. two rows of three cables each. The trench 15 then comprises refilled excavated material or soil 17 up to the ground surface 20.

The embodiments show that further possibilities, not shown in the drawings, are available to obtain the advantages of the invention. It is also possible, to use three heights of cables 10, i.e. add a further layer in a distance h3 from ground surface 20, but the better approach would be to use more cables one beside the other to avoid that someone knowing the placements of the trench jumps or is carried above ground over the entire system.

It is also possible to provide the cables 10 of FIG. 5A at two or three different heights below ground, as long as the depth is predetermined and this predetermined depth can be calibrated to calculate back and identify the type of intrusion. In other words, the time of flight of the light, either backscattered or transmitted, indicate the position of the intrusion. The knowledge of the disposition of the cables at that place along the cable 10 allows deducting the kind of intrusion, i.e. the object identification.

Figure 6A:
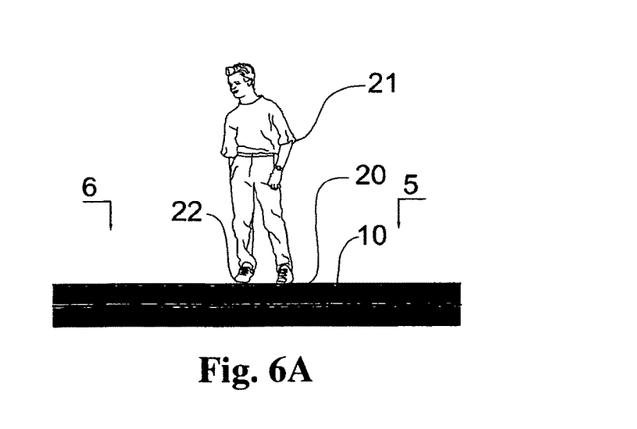
FIG. 6A to 6C show a schematic sketch of the mechanical inverse analysis with a representation of an object, the measured strain and the calculation steps.
Figure 6B:
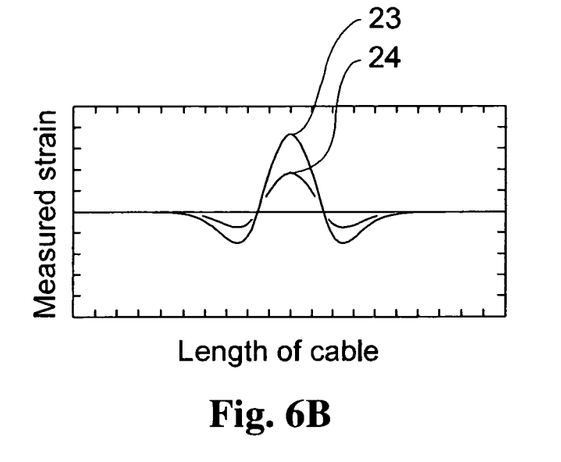
Figure 6C:
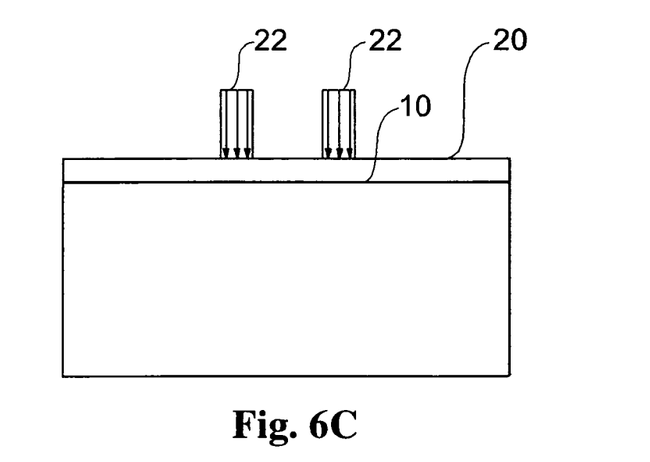

FIG. 6A to 6C show a schematic sketch of the mechanical inverse analysis. The following definitions are used in this context and are used as such in the drawings: FIG. 6A shows an intruding object 21 as an example like object 4 in FIG. 1 entering the perimeter 2 by crossing the buried fiber optic cables 10. The weight of the intruder 21 on the ground surface 20 and as such on the soil induces contact forces 22 between the intruder 21 and the ground surface 20. These contact forces 22 induce a stress field in the ground which is in equilibrium with the contact forces acting on the ground surface 20. Depending on the stiffness of the ground the stress field corresponds to a displacement field of the ground. These displacements are transferred to the cables and yields to a change in the length of the cables. The relative change in the length of the cables, i.e. strain, is measured with a distributed fibre optic interrogator.

FIG. 6B shows the induced strain in two or more fibre optic cables which is measured dynamically with commercially available distributed fibre optic sensing interrogators 13. Using the measured strain in all the cables 10 allows the detection of an intruder 21 and his localization along the cables 10. Curve 23 shows the result of a schematic strain measurement conducted in a fibre optic cable 10 near to the object. Further schematic strain measurements as shown in curve 24 are conducted in a different fibre optic cable 10 parallel to the cable 23 further away from the object 21. The value of the strain is shown against the position on the cable 10, which is already deducted from time delay measurements of the back scattered light (or the light in a optic fibre ring, then the cable and fibre does not have an open end but forms a ring for delay time measurements).

FIG. 6C shows the contact forces 22 between the object 21 and the ground surface 20, back-calculated from the measurements along the fibre optic cables 10.

Figure 7:
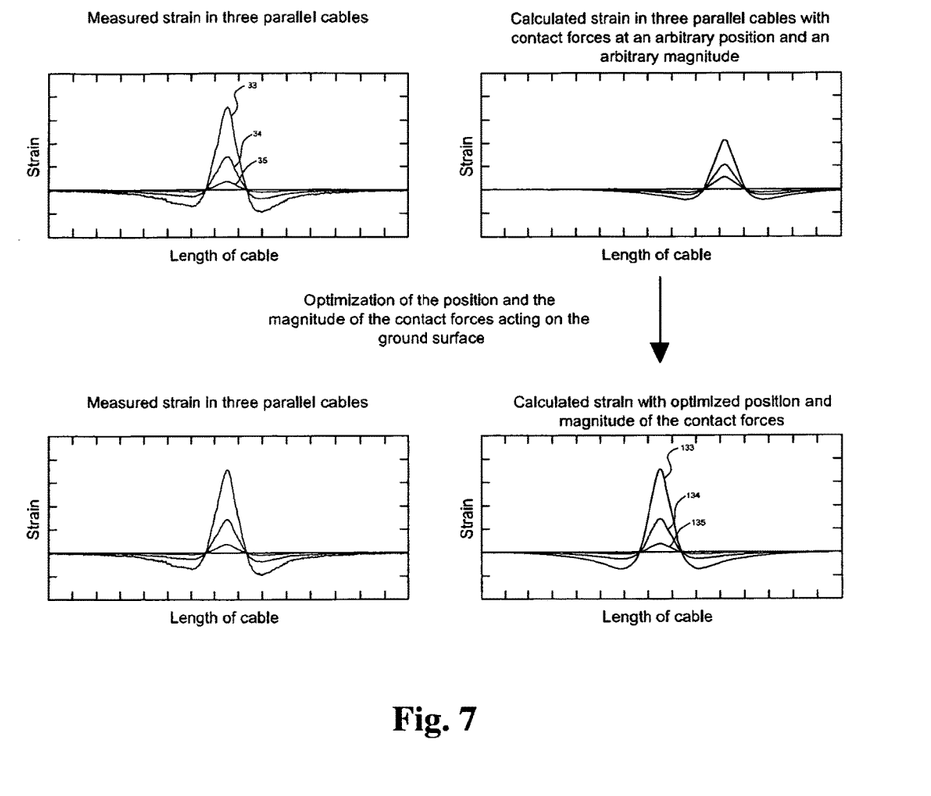
FIG. 7 shows a schematic procedure of inverse analysis using the data of three strain measurements along parallel buried fibre optic cables.

FIG. 7 shows a schematic procedure of inverse analysis using the data of three strain measurements along parallel buried fibre optic cables 10 in a depth of h=40 centimeters and with a distance to each other of a=50 centimeters, with the meaning of a and h as defined above. Therein, first cable 10 is located directly under the person standing on the ground surface 20. The strain 33, 34 and 35, respectively, along the three cables 10 is calculated with arbitrary contact forces at the ground surface 20. By minimizing the error between the calculated strains and the measured strains in all the three cables 10, the position of the contact forces 22 and their magnitude is optimized.

Representative the inverse analysis is shown here for a static point load using an isotropic linear elastic constitutive law to model the soil. Depending on the type of object crossing the perimeter with the buried fibre optic cables more than one load can occur or not only point loads occur.

In the mechanical model arbitrary forces acting on the surface produces the calculated strain 33, 34, 35 along the three cables 10. Depending on the ground conditions the strain along the cables can be calculated using different constitutive laws (e.g. linear isotropic elasticity, Boussinesq (1885); linear cross-anisotropic elasticity; non-linear elasticity, Puzrin and Burland (1996); elasto-plastic constitutive laws). Using the simplest isotropic linear elastic constitutive law, the strains along one cable due to a point load acting at the position $x_p$, $y_p$ are calculated by:

$$\varepsilon_{xx} = (x, y_c, z_c) = P \cdot f(x, x_p, y_c, y_p, z_c)$$

with $$f(x, x_p, y_c, y_p, z_c) = \frac{1+v}{2\pi E} \cdot \left[ \frac{z_c(\tilde{y}^2 - 2\tilde{x}^2 + z_c^2)}{R_1^5} + \frac{(1-2v)\left(\tilde{x}\left(\frac{z_c \cdot x}{R_1} + 2x\right)\right)}{R_2^2} - \frac{(1-2v)}{R_2} \right]$$

and $$R_1 = \sqrt{\tilde{x}^2 + \tilde{y}^2 + z_c^2}$$

$$R_2 = z_c(R_1 + z_c) + \tilde{x}^2 + \tilde{y}^2$$

$$\tilde{x} = x - x_p$$

and $$\tilde{y} = y_c - y_p$$

Wherein x is the spatial coordinate along the cable, $y_c$ and $z_c$ denote the location and the depth of the cable with respect to a predefined reference point at the ground surface. E denotes the youngs-modulus and v denotes the poisson's ratio of the soil.

Now the calculated strains are compared to the measured strains along the cable. The position of the forces and their magnitudes can be back-calculated with different methods, e.g. minimization of the sum of squared error:

$$\min\left( \sum_{i=1}^{N} (\varepsilon_{calculated}(x_i, P, x_p, y_p) - \varepsilon_{measured}(x_i))^2 \right)$$

The minimization of the sum of squared error can be done with gradient based nonlinear optimization or more sophisticated optimization algorithms (e.g. Levenberg-Marquard, Trust-region-reflective, genetic algorithms, particle swarm optimizers). For the inverse analysis the strain measurements of all buried fibre optic cables are used in order to ensure a distinct and accurate back-calculation of the forces acting on the ground surface.

Since the strain measurements are taken with high temporal resolution, this inverse analysis allows for back-calculating the forces acting on the surface with the same temporal resolution.

Figure 8A:
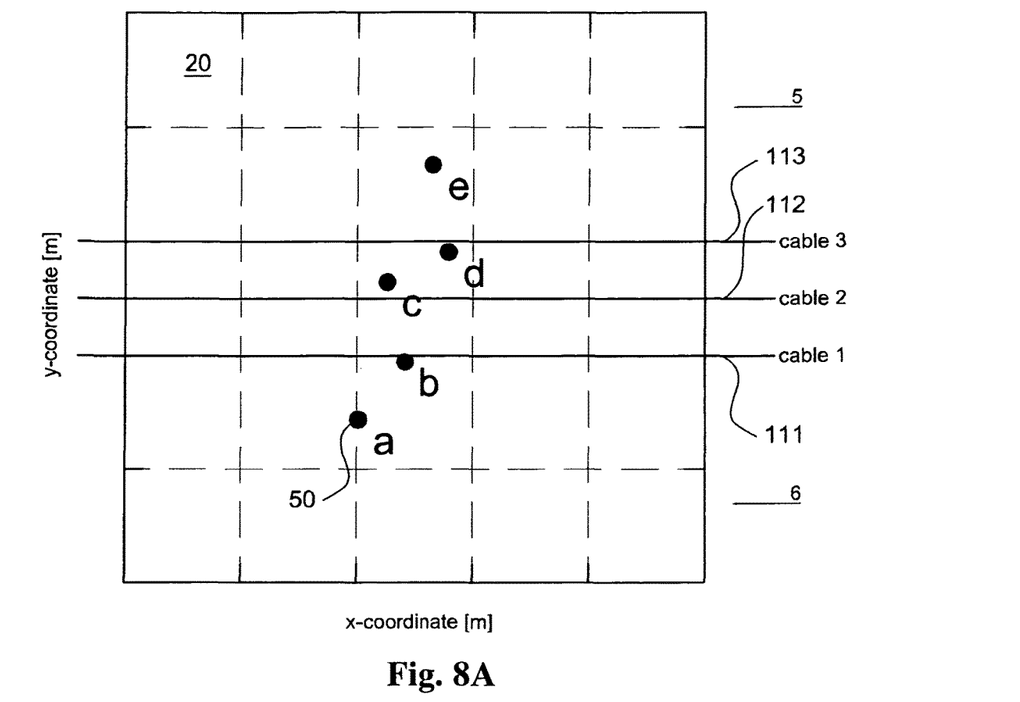
FIGS. 8A & 8B shows a schematic sketch of the inverse calculated contact force pattern on the surface for a pedestrian crossing the perimeter with three buried fibre optic cables.
Figure 8B:
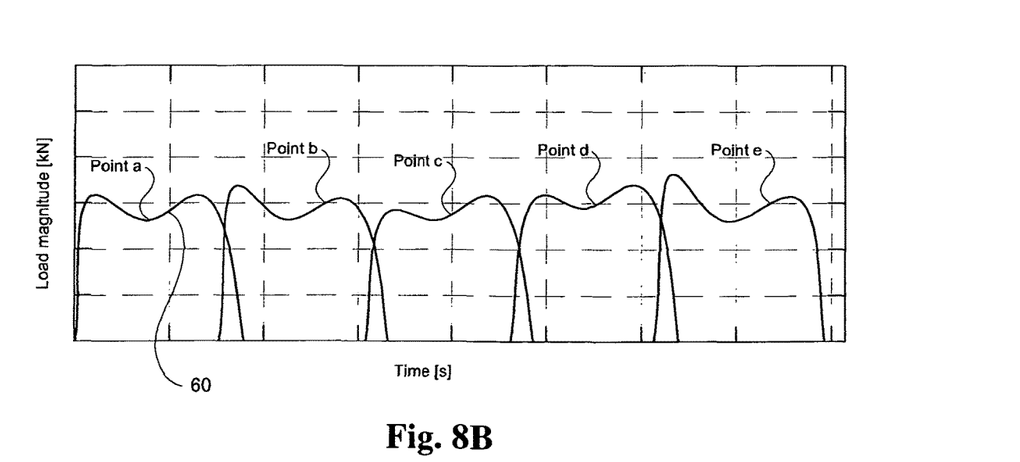
Figure 9A:
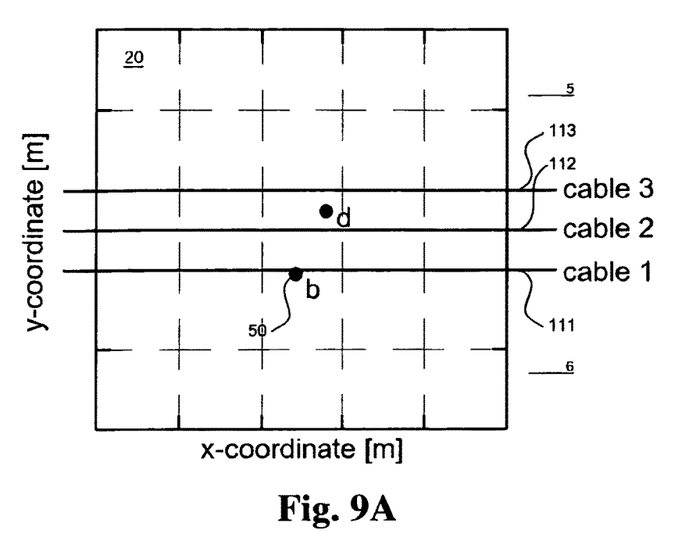
FIG. 9A to 9C shows different strain measurements along three parallel buried fibre optic cables with a pedestrian crossing the perimeter.
Figure 9B:
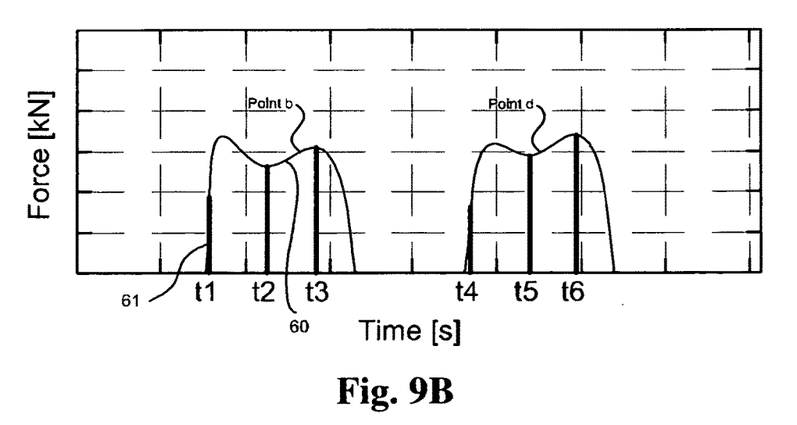
Figure 9C:
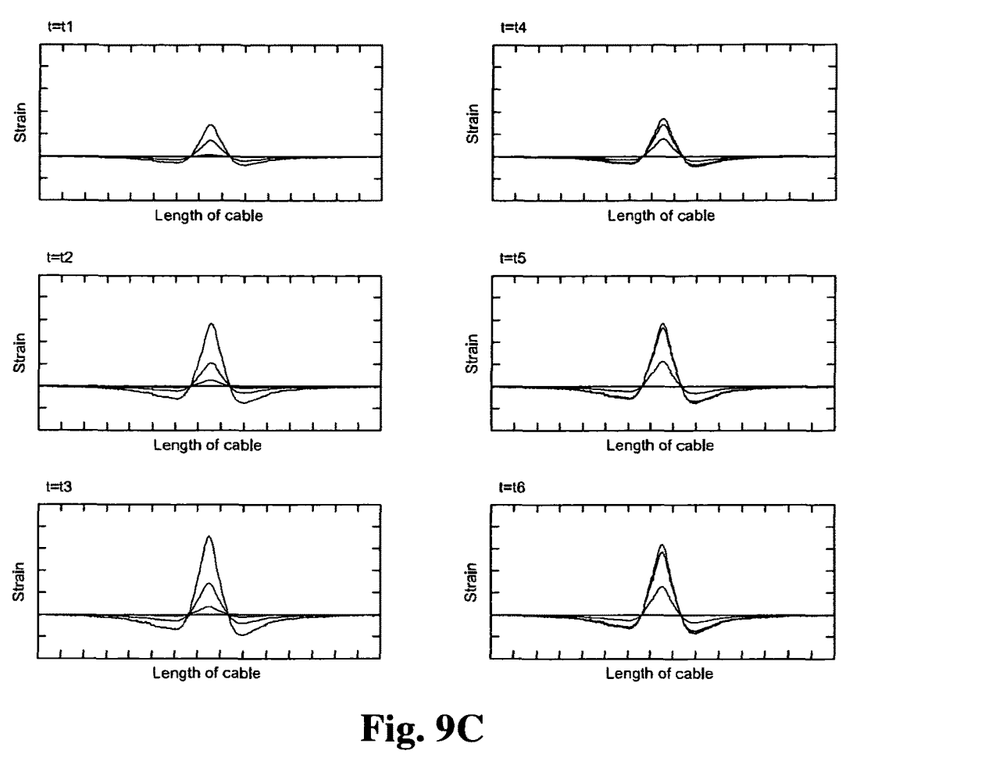

FIGS. 8A and 8B show a schematic sketch of the inverse calculated contact force pattern on the surface 20 for a pedestrian 21 crossing the perimeter 2 with three buried fibre optic cables 10 and FIG. 9A to 9C show different strain measurements along three parallel buried fibre optic cables 10 with a pedestrian 21 crossing the perimeter 4. Therein is defined and shown: FIG. 8A and FIG. 9A show the locations 50 of the contact forces 22, each point (a, b, c, d, e, or b, d, respectively) corresponds to a footstep, also designated with reference numeral 50. FIG. 8B and FIG. 9B show the load 60 over time for footsteps 50 at all locations from FIG. 8A or 9A, respectively, wherein in FIG. 9B specific moments in time are chosen as t1 to t6 with the respective force values 61.

FIG. 9C shows measured strains along the three buried cables 10 for the time steps t1 to t6 corresponding to the magnitude 60 of the contact force 22 shown in FIG. 9B. Time steps t1, t2 and t3 correspond to the position of the contact force b and time steps t4, t5 and t6 correspond to the position of the contact force d.

| LIST OF REFERENCE SIGNS |
| --- |
| 1 Sensitive facility |
| 2 Secured perimeter |
| 3 Feed cable |
| 4 Object, to be identified |
| 5 outside the perimeter |
| 6 inside the perimeter |
| 10 tight buffered fibre optic cable |
| 11 free end of the fibre optic cable |
| 12 further end of the fibre optic cable |
| 13 dynamic distributed fibre optic interrogator |
| 14 control unit |
| 15 trench |
| 16 ground |
| 17 refilled excavated material, soil |
| 18 bottom surface of trench |
| 20 ground surface |
| 21 object moving or standing on the surface |
| 22 contact forces between the object and the ground surface |
| 23 schematic strain measurements in a fibre optic cable near to the object |
| 24 schematic strain measurements in a fibre optic cable parallel further away from the object |
| 33 measured strain in first cable |
| 34 measured strain in second cable |
| 35 measured strain in third cable |
| 50 foot step |
| 60 load magnitude over time |
| 61 load magnitude at time t1 |
| 111 first cable |
| 112 second cable |
| 113 third cable |
| 133 optimized strain for first cable |
| 134 optimized strain for second cable |
| 135 optimized strain for third cable |
| a horizontal distance between two adjacent cables |
| h depth of a cable with respect to the ground surface |
| h1 depth of an upper buried fibre optic cable with respect to the ground surface |
| h2 depth of a lower buried fibre optic cable with respect to the ground surface |
| t1-t6 time steps |

The invention claimed is:

1. A fiber optic based intrusion sensing system comprising:
   at least two fiber optic cable parts buried in a shallow trench in the ground, side by side in a predetermined nonzero distance to each other, and at least one predetermined depths,
   at least one dynamic distributed fiber optic interrogator measuring a predetermined property related to a change in length of the at least two fiber optic cable parts; and
   a control unit;
   wherein each of the at least two fiber optic cable parts has one end connected to said at least one fiber optic interrogator and one of a free second end at the end of a monitored perimeter and the second end is also connected to said at least one fiber optic interrogator;
   wherein the control unit is connected to all of said at least one fiber optic interrogator and adapted to analyze the measurements of said predetermined property and adapted to identify an object on a ground surface by combining simultaneous measurements of all fiber optic cable parts; and
   wherein the control unit analyzes the measurements and identifies objects on the surface by combining the measurements of all of the at least two parallel fiber optic cable parts and performing mechanical inverse analysis in order to calculate dynamic contact forces acting between the object and the ground surface and using a calculated pattern of contact forces over time and correlate the pattern to a type of object on the ground surface, a location of the object on the monitored perimeter, a weight of the object, a speed of the object and a direction of the object.

2. The system of claim 1, wherein the at least two fiber optic cable parts are placed one over each other with defined nonzero distances to each other.

3. The system of claim 1, wherein the at least two fiber optic cable parts are at least three fiber optic cable parts placed in a matrix configuration with a predetermined defined nonzero distance to each other.

4. The system according to claim 1, wherein the at least two fiber optic cable parts are realized through at least one serpentine-distributed fiber optic cable placed in serpentines in such a way that each cross-section of the trench is crossed at least two times by the at least one serpentine-distributed fiber optic cable and each part of the at least one serpentine-distributed fiber optic cable between the bends of the serpentine is parallel to each other with a defined nonzero distance to each other and in a defined depth, wherein each part of the at least one serpentine-distributed fiber optic cable between the bends has the same function as one of the at least two fiber optic cable parts.

5. The system of claim 1, wherein at least one fiber optic cable is placed in a loop in such a way that the arms of the loop are parallel to each other in one trench with a defined nonzero distance to each other and in a defined depth, wherein each arm of the loop has the same function as one of the at least two fiber optic cable parts.

6. The system of claim 5 wherein both ends of the at least one fiber optic cable are connected to the at least one fiber optic interrogator.

7. The system according to claim 1, wherein the control unit receives further calibration signals based on the mechanical inverse analysis in advance by moving defined objects over the ground surface and using knowledge of the objects, as input in order to calibrate parameters of the mechanical inverse analysis, wherein the receiving of the further calibration signals is done in a laboratory on a standardized soil used to refill the trench in a field.

8. The system according to claim 1, wherein the mechanical inverse analysis is improved in advance by moving defined objects over the ground surface and using knowledge of the objects, as input in order to calibrate the parameters of the mechanical inverse analysis, wherein this calibration process is done in a field, after placing the at least two fiber optic cable parts inside of the trench and refilling it, in order to determine an in situ parameter of the ground.

9. The system of claim 7, embodied as a perimeter security system, wherein the control unit, based on the identification of the object on the ground surface and predefined threatening objects, decides whether the object passing the monitored perimeter is threatening or not and based on this decision generates an alarm.

10. The system of claim 1, wherein the at least two fiber optic cable parts are buried in a shallow trench in the ground parallel to each other.

11. The system of claim 1, wherein the direction of the object is a direction in or out of the monitored perimeter.

* * * * *